(12) United States Patent
Kumatoriya (10) Patent No.: US 7,787,715 B2
(45) Date of Patent: Aug. 31, 2010

(54) TE-TM MODE CONVERTER

(75) Inventor: Makoto Kumatoriya, Otsu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 20 days.

(21) Appl. No.: 12/018,290

(22) Filed: Jan. 23, 2008

(65) Prior Publication Data

US 2008/0175528 A1  Jul. 24, 2008

(30) Foreign Application Priority Data

Jan. 23, 2007  (JP) .............. 2007-013170

(51) Int. Cl.
*G02B 6/10* (2006.01)
(52) U.S. Cl. .......................... 385/11; 385/40
(58) Field of Classification Search .............. 385/11, 385/28
See application file for complete search history.

(56) References Cited

U.S. PATENT DOCUMENTS

| | | | |
|---|---|---|---|
| 3,877,782 A * | 4/1975 | Kaminow | ............... 385/130 |
| 4,284,663 A * | 8/1981 | Carruthers et al. | ......... 264/1.24 |
| 4,384,760 A * | 5/1983 | Alferness | ..................... 385/11 |
| 4,732,444 A * | 3/1988 | Papuchon et al. | ............. 385/40 |
| 4,761,049 A * | 8/1988 | Burns et al. | ................... 385/40 |
| 4,776,656 A * | 10/1988 | Sanford et al. | ................. 385/2 |

FOREIGN PATENT DOCUMENTS

| | | |
|---|---|---|
| JP | 11-326853 | 11/1999 |
| WO | WO 2005/049879 | 6/2005 |

OTHER PUBLICATIONS

Eknoyan et al. "Broadband LiTaO guided-wave TE-TM mode Converter" Applied Optics, vol. 27, No. 1, Jan. 1988, pp. 114-117.

* cited by examiner

*Primary Examiner*—Sarah Song
(74) *Attorney, Agent, or Firm*—Dickstein Shapiro LLP (57) ABSTRACT

A TE-TM mode converter is provided which is capable of performing a TE-TM conversion in a wide bandwidth. In a TE-TM mode converter using an electrooptic effect, a waveguide is formed on a substrate using lithium tantalate having a birefringence of about 0.0005 or less. The direction of an optical axis of lithium tantalate forming the waveguide is approximately parallel to a primary surface of the substrate. In addition, a first electrode and a second electrode are provided on the primary surface of the substrate so as to face each other with the waveguide placed therebetween.

12 Claims, 12 Drawing Sheets

PRIOR ART

TE-TM MODE CONVERTER

BACKGROUND OF THE INVENTION

1. Field of the Invention

The present invention relates to TE-TM mode converters, and more particularly, relates to a TE-TM mode converter using an electrooptic effect.

2. Description of the Related Art

Figure 12:
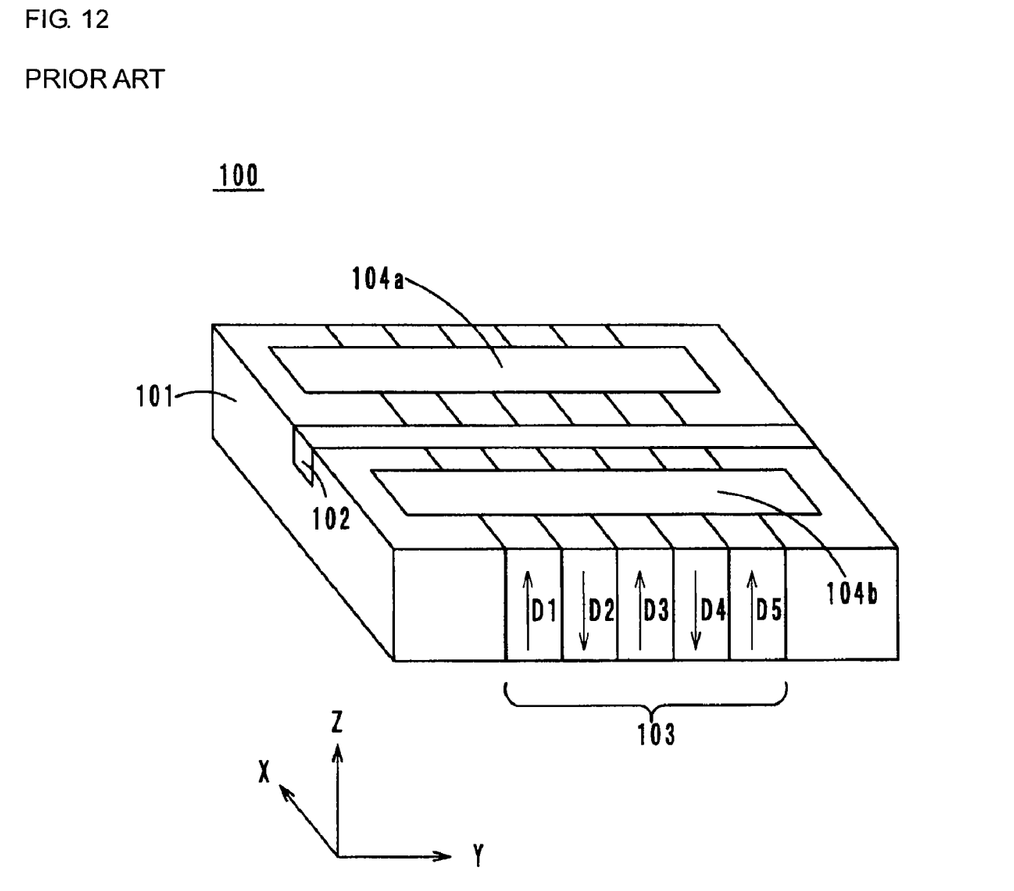
FIG. 12 is a perspective view showing the appearance of a related polarization controller.

As a related TE-TM mode converter, a polarization controller 100 described in Japanese Unexamined Patent Application Publication No. 2003-202532 has been proposed. FIG. 12 is a perspective view showing the appearance of the polarization controller 100.

The polarization controller 100 shown in FIG. 12 has a ferroelectric substrate 101, a waveguide 102, a mode conversion portion 103, and plate electrodes 104a and 104b. The mode conversion portion 103 includes domain regions D1 to D5 disposed along a light-wave traveling direction in the waveguide 102. In addition, the plate electrodes 104a and 104b are provided on the mode conversion portion 103 so as to sandwich the waveguide 102.

In the polarization controller 100, when a control voltage is applied to the plate electrodes 104a and 104b, an electric filed is generated parallel to a primary surface of the ferroelectric substrate 101 and perpendicular to a longitudinal direction of the waveguide 102. Accordingly, the principal axis rotation of the index ellipsoid of the waveguide 102 occurs, and two types of light waves (TE mode and TM mode) having planes of polarization, which are perpendicular to each other, are coupled, so that a TE-TM mode conversion occurs. In addition, since the domain regions D1 to D5 are disposed so that the polarization directions are alternately opposite to each other, they function as a grating which performs phase matching between the two types of light waves. As a result, the polarization controller 100 can perform the TE-TM mode conversion with high conversion efficiency.

However, the polarization controller 100 performing the TE-TM mode conversion by the grating has a problem in that the bandwidth of light waves, in which the TE-TM mode conversion can be performed, is narrow. In particular, as a communication wavelength for optical communication, a light wave having a wavelength of about 1,550 nm, which belongs to the C-band (1,530 to 1,565 nm), is used in many cases. Hence, in order to perform the TE-TM mode conversion for the above light wave, it is necessary to drive the polarization controller 100 in a bandwidth of 35 nm. However, it has been difficult to drive the polarization controller 100 in a bandwidth of 35 nm.

SUMMARY OF THE INVENTION

Accordingly, an object of the present invention is to provide a TE-TM mode converter capable of performing a TE-TM mode conversion in a wide bandwidth.

According to a preferred embodiment of the present invention, there is provided a TE-TM mode converter using an electrooptic effect, comprising: a substrate; and a waveguide which is composed of lithium tantalate having a birefringence of about 0.0005 or less and which is disposed on the substrate.

According to a preferred embodiment of the present invention, when lithium tantalate having a birefringence of about 0.0005 or less is used as a material for the waveguide, a TE-TM mode conversion rate for light waves in the C-band can be increased to 90% or more.

According to a preferred embodiment of the present invention, the birefringence is preferably about 0.0003 or less. As a result, the TE-TM mode conversion rate for light waves in the C-band can be increased to about 95% or more.

According to a preferred embodiment of the present invention, the TE-TM mode converter preferably further comprises a voltage application unit as a mode conversion portion to apply a control voltage to the waveguide in a direction perpendicular to a traveling direction of light. By applying the control voltage as described above, the principle axis of the index ellipsoid of the waveguide can be rotated. As a result, a TE-TM mode converter can be formed which performs a TE-TM mode conversion for light waves in a wide bandwidth, such as the C-band.

According to a preferred embodiment of the present invention, the above voltage application unit preferably includes a first electrode disposed between the substrate and the waveguide, and a second electrode disposed to face the first electrode with the waveguide interposed therebetween. When lithium tantalate having a birefringence of about 0.0005 or less is used as a substrate material for the waveguide, the domain regions D1 to D5 having polarization directions alternately opposite to each other, which are provided in the polarization controller 100 described in Japanese Unexamined Patent Application Publication No. 2003-202532, are not necessary to be formed. When the domain regions D1 to D5 are provided as described above, a substrate of lithium tantalate having a primary surface perpendicular to the Z axis must be used, and when the domain regions D1 to D5 are not provided, a substrate of lithium tantalate having a primary surface perpendicular to the Y axis may be used. As a result, electrodes applying a control voltage can be disposed on the top and the bottom of the waveguide. That is, the distance between the two electrodes can be decreased, and with a small voltage, the TE-TM mode converter can be driven.

According to the preferred embodiments of the present invention, since the waveguide is formed from $LiTaO_3$ (lithium tantalate) having a birefringence of about 0.0005 or less, a TE-TM mode converter used for a wide bandwidth including the C-band can be manufactured.

Other features, elements, characteristics and advantages of the present invention will become more apparent from the following detailed description of preferred embodiments of the present invention with reference to the attached drawings.

DESCRIPTION OF THE PREFERRED EMBODIMENTS

Hereinafter, a TE-TM mode converter according to one embodiment of the present invention will be described with reference to the drawings.

Figure 1:
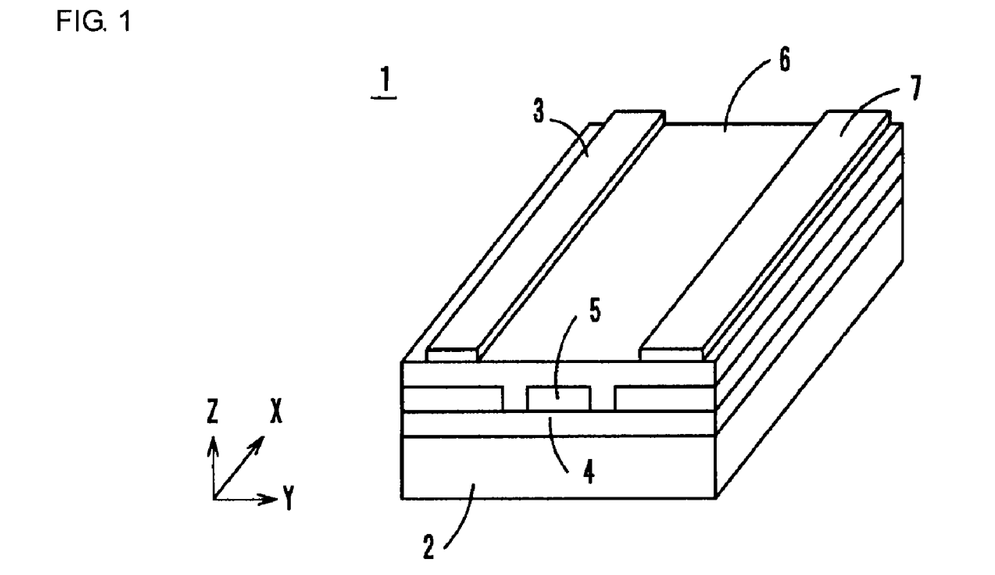
FIG. 1 is a perspective view showing the appearance of a TE-TM mode converter according to an embodiment of the present invention.
Figure 2A:
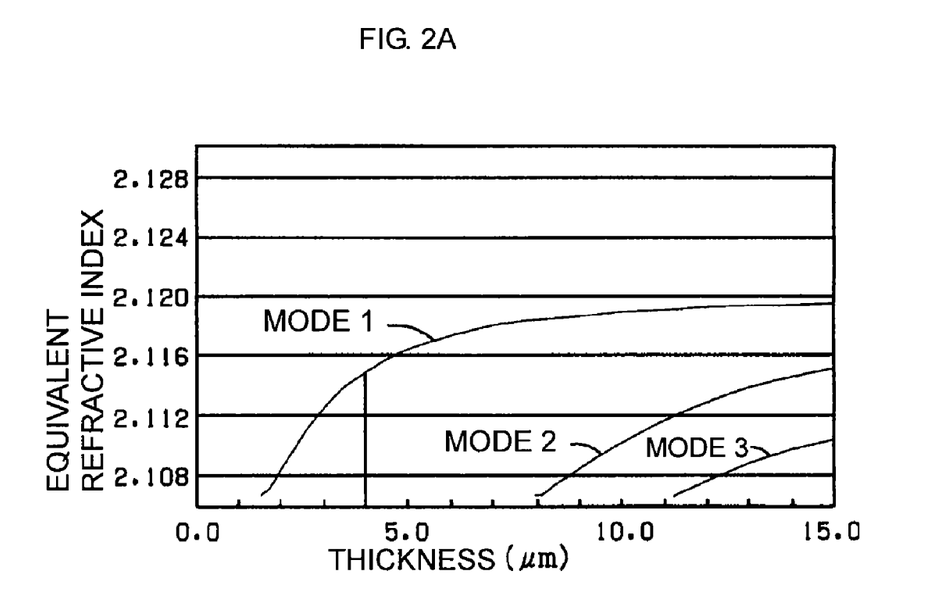
FIG. 2A is a graph showing the relationship between the thickness of a waveguide and the equivalent refractive index of the TE mode.
Figure 2B:
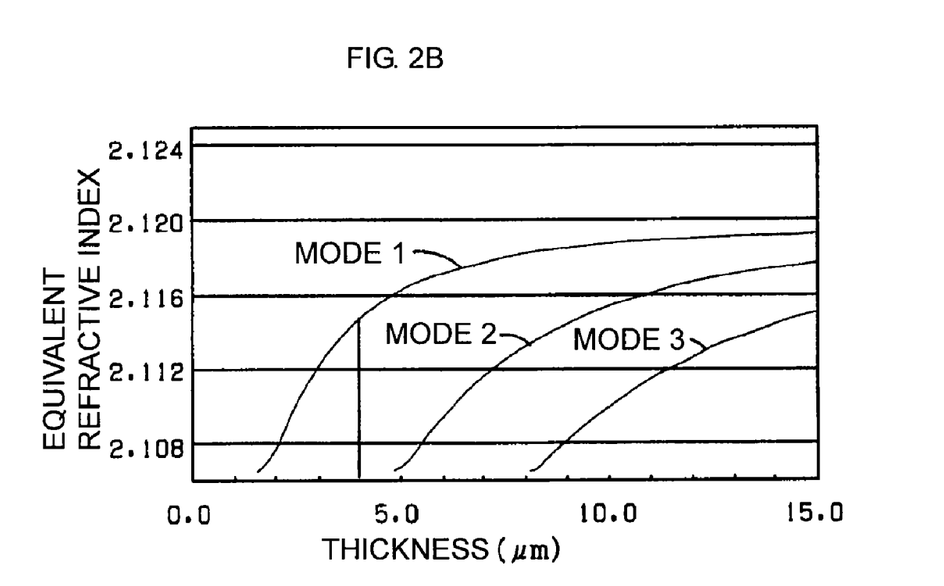
FIG. 2B is a graph showing the relationship between the thickness of a waveguide and the equivalent refractive indexes of the TM mode.
Figure 3A:
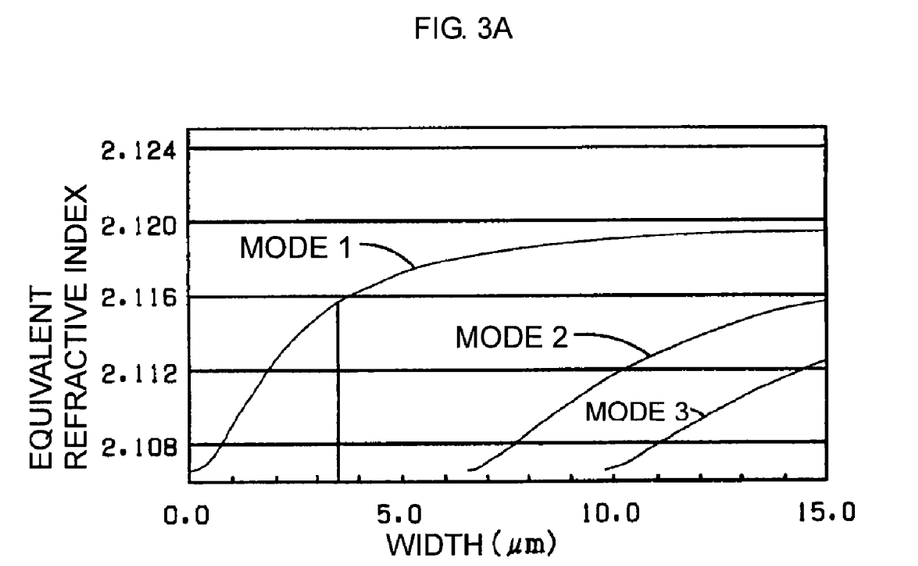
FIG. 3A is a graph showing the relationship between the width of a waveguide and the equivalent refractive index of the TE mode.
Figure 3B:
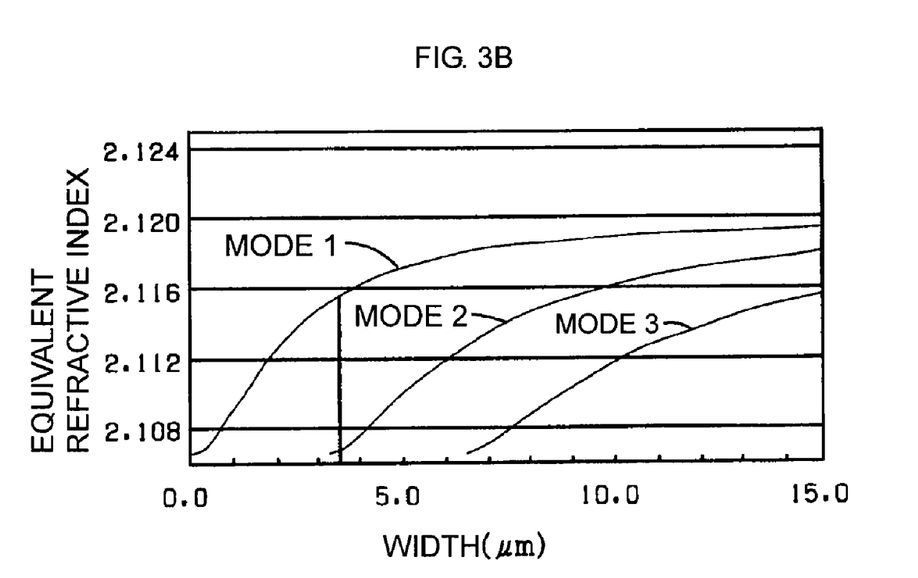
FIG. 3B is a graph showing the relationship between the width of a waveguide and the equivalent refractive indexes of the TM mode.

FIG. 1 is a perspective view showing the appearance of a TE-TM mode converter 1. FIG. 2A is a graph showing the relationship between the thickness of a waveguide and the equivalent refractive index of the TE mode. FIG. 2B is a graph showing the relationship between the thickness of a waveguide and the equivalent refractive indexes of the TM mode. In the above graphs, the horizontal axis indicates the thickness of the waveguide, and the vertical axis indicates the equivalent refractive index of the TE mode and that of the TM mode. FIG. 3A is a graph showing the relationship between the width of a waveguide and the equivalent refractive index of the TE mode. FIG. 3B is a graph showing the relationship between the width of a waveguide and the equivalent refractive indexes of the TM mode. In the above graphs, the horizontal axis indicates the width of the waveguide, and the vertical axis indicates the equivalent refractive index of the TE mode and that of the TM mode.

The TE-TM mode converter 1 is a device performing a TE-TM mode conversion using an electrooptic effect and has a substrate 2 composed of $LiTaO_3$ (lithium tantalate), a first electrode 3 composed of Al, a lower clad layer 4 composed of a UV adhesive, a waveguide 5 composed of $LiTaO_3$ having a very small birefringence, an upper clad layer 6 composed of $TiO_2$, and a second electrode 7 composed of Al.

The substrate 2 is a substrate composed of $LiTaO_3$ having a molar fraction [Li]/([Li]+[Ta]) of 0.492, a birefringence of about 0.0004, and a thickness of 0.5 mm. This substrate 2 is a Z-cut crystal obtained by cutting approximately perpendicular to the Z axis.

The lower clad layer 4 is formed on the substrate 2. The thickness of the lower clad layer 4 is 0.2 μm or more. On the lower clad layer 4, the waveguide 5 is formed, and the lower clad layer 4 functions to adhere between the substrate 2 and the waveguide 5.

The waveguide 5 functions to guide a light wave in a longitudinal direction thereof and is formed on the substrate 2 with the lower clad layer 4 interposed therebetween so as to be approximately parallel to the first electrode 3 and the second electrode 7. The waveguide 5 is composed of $LiTaO_3$ having a molar fraction [Li]/([Li]+[Ta]) of 0.492 and a birefringence of about 0.0004. The waveguide 5 has a thickness of 4 μm and a width of 3.5 μm. The thickness and the width of this waveguide 5 are designed so that a single-mode light wave having a wavelength of 1.55 μm is only guided and so that the birefringence has a minimum value. In particular, from the graphs shown in FIGS. 2A and 2B, the thickness of the waveguide 5 at which the equivalent refractive index of a single-mode TE light wave and that of a single-mode TM light wave approximately coincides with each other was obtained as 4 μm. In a manner similar to that described above, from the graphs shown in FIGS. 3A and 3B, the width of the waveguide 5 at which the equivalent refractive index of a single-mode TE light wave and that of a single-mode TM light wave approximately coincides with each other was obtained as 3.5 μm. In addition, when the graphs described above were prepared, $TiO_2$ was used as a material for the clad layer in contact with the top and side surfaces of the waveguide 5, and the refractive index of $TiO_2$ (no=2.0595, and ne=2.1065) was calculated by a Sellmeier equation using a dispersion coefficient described in "Optical Multilayer Film Simulation Technique and Optimum Design by EXCEL VBA" authored by Masayuki Nakamura, and published from Technical Information Institute Co., Ltd.

The waveguide 5 is a Z-cut crystal obtained by cutting perpendicular to the Z axis as is the substrate 2. In addition, the birefringence of the substrate 2 and that of the waveguide 5 may be about 0.0005 or less and more preferably about 0.0003 or less. The birefringence of the waveguide 5 will be described later.

The upper clad layer 6 is formed of a $TiO_2$ film and covers the top and the side surfaces of the waveguide 5. Hence, the waveguide 5 is surrounded by materials having a refractive index lower than that the waveguide 5 so as to confine light therein.

The first electrode 3 and the second electrode 7 are formed from Al on the primary surface of the upper clad layer 6 to face each other with the waveguide 5 placed therebetween and to be approximately parallel to the waveguide 5. The width of the first electrode 3 and that of the second electrode 7 are each 100 μm, and the distance therebetween is 20 μm.

In addition, in the TE-TM mode converter 1, by applying a control voltage between the first electrode 3 and the second electrode 7, the control voltage is applied to the waveguide 5 in a direction perpendicular to a traveling direction of a light wave. Hence, by the electrooptic effect, the principle axis rotation of the index ellipsoid of the waveguide 5 occurs, and the two types of waves (TE mode and TM mode) having planes of polarization perpendicular to each other are coupled together, so that the TE-TM mode conversion occurs.

In the TE-TM mode converter 1 having the structure as described above, since a material having a very small birefringence of about 0.0005 or less as compared to that of a commercially available material is used for the waveguide 5, the TE-TM mode conversion can be performed for light waves having wavelengths in a wide waveband. Hereinafter, the TE-TM mode conversion will be described in detail.

In optical communication, the communication wavelength bands are defined as follows.
O band: 1,260 to 1,360 nm
E band: 1,360 to 1,460 nm
S band: 1,460 to 1,530 nm
C band: 1,530 to 1,565 nm
L band: 1,565 to 1,625 nm In optical communication, a light wave having a wavelength of about 1,550 nm is generally used. This light wave belongs to a communication waveband of the C band. Hence, the TE-TM mode converter must perform a sufficient TE-TM mode conversion within a bandwidth of 35 nm which is the communication bandwidth of the C band. Accordingly, a TE-TM mode conversion rate with the change in birefringence is obtained by calculation.

First of all, in a lossless waveguide which is uniform in a propagation direction (x direction), various waveguide modes which satisfy the boundary conditions of the waveguide are present, and these modes are not coupled with each other and independently propagate powers. Based on the conditions described above, when perturbation at a certain level is applied to the waveguide, the modes under non-perturbation conditions are no longer independently present and are coupled to each other.

Figure 4:
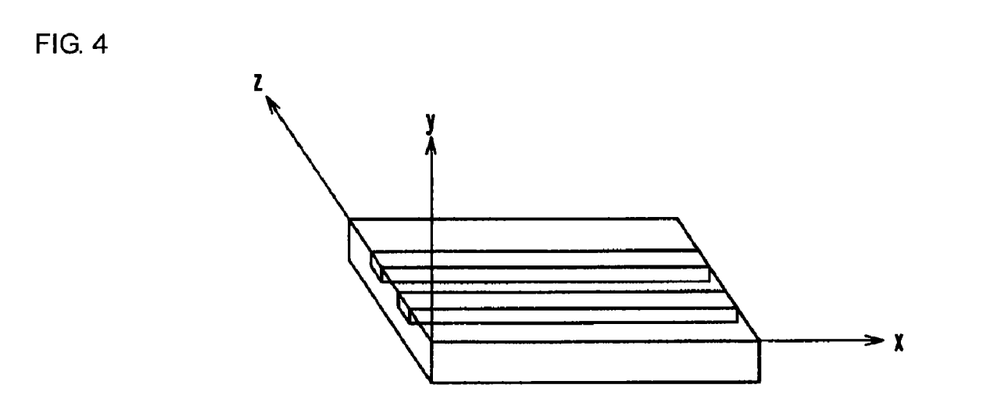
FIG. 4 is a perspective view showing the appearance of a substrate in which two waveguides are formed.

In this embodiment, the case is assumed in which two types of modes, TE and TM modes, propagate in two waveguides shown in FIG. 4 in an x direction at propagation constants $\beta_{TE}$ and $\beta_{TM}$, respectively.

Light waves $\psi_{TE}$ and $\psi_{TM}$ are represented as follows.

[Equation 1]

$$\begin{cases} \psi_{TE}(x,y,z,t) = C_{TE}(x)e^{-j\beta_{TE}x}f_{TE}(y,z)e^{j\omega t} \\ \psi_{TM}(x,y,z,t) = C_{TM}(x)e^{-j\beta_{TM}x}f_{TM}(y,z)e^{j\omega t} \end{cases} \quad (1)$$

In the above equations, $C_{TE}(x)$ and $C_{TM}(x)$ indicate the amplitudes of the respective modes, and $f_{TE}$ and $f_{TM}$ indicate field distribution functions each obtained from a normalized power flow in a cross-section. When the coupling occurs, $C_{TE}(x)$ and $C_{TM}(x)$ are not independent of each other. A mode coupling equation of the same direction coupling in which coupling is performed in the x axis propagation at a coupling coefficient $\kappa$ (positive actual number) can be represented by the following equations (2) in which n indicates a grating cycle, $r_{51}$ indicates an electrooptic coefficient, and $E_y$ indicates a voltage applied to the Y axis direction.

[Equation 2]

$$\begin{cases} \dfrac{dC_{TE}(x)}{dx} = -j\kappa(x)C_{TM}(x)e^{-j(\beta_{TM}-\beta_{TE})x} \\ \dfrac{dC_{TM}(x)}{dx} = -j\kappa(x)C_{TE}(x)e^{+j(\beta_{TE}-\beta_{TM})x} \\ \kappa(x) = \dfrac{\pi}{\lambda} \times n^3 \times r_{51} \times E_y \end{cases} \quad (2)$$

The general solutions of Equation (1) are represented as follows when $C_{TE0}$ and $C_{TM0}$ are regarded as constants.

[Equation 3]

$$\begin{cases} C_{TE}(x) = (C_{TE_0}e^{-j\gamma x} + C_{TE_0}e^{j\gamma x})e^{-j\gamma x} \\ C_{TM}(x) = \left(\dfrac{\kappa(x)}{\sqrt{\gamma-\delta}}C_{TE_0}e^{-j\gamma x} + \dfrac{\kappa(x)}{\sqrt{\gamma+\delta}}C_{TM_0}e^{j\gamma x}\right)e^{-j\gamma x} \end{cases} \quad (3)$$

In the above solutions, the following equations hold.

[Equation 4]

$$\gamma = \sqrt{\kappa(x)^2 + \delta^2}$$

$$2\delta = \beta_{TM} - \beta_{TE} \quad (4)$$

In addition, since $\beta = k_0 N$, and $k_0 = 2\pi/\lambda$ hold, the following equation holds.

[Equation 5]

$$\delta = |N_{TM} - N_{TE}|(\pi/\lambda - \pi/\Lambda) \quad (5)$$

In the above equation, $N_{TE}$ and $N_{TM}$ indicate the equivalent refractive indexes of the TE and the TM modes, respectively. In addition, $\delta$ represented by the equation (4) indicates a phase mismatching amount.

Figure 5:
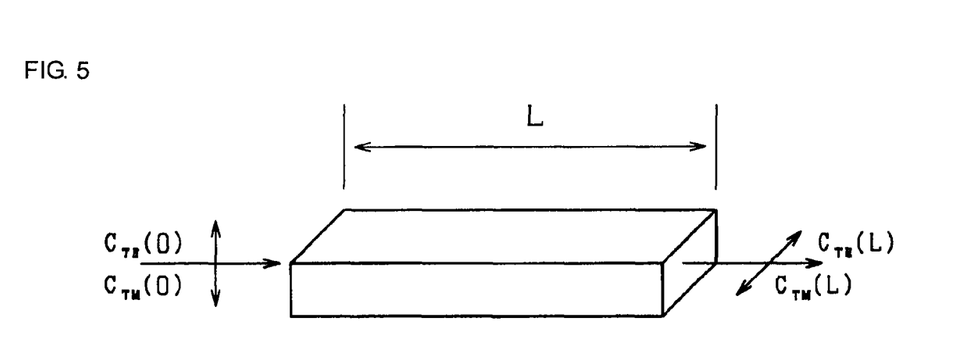
FIG. 5 is a perspective view showing the state of a light wave being guided in a waveguide.

Next, in a waveguide having a unit section L as shown in FIG. 5, when amplitudes at a position zero (0) are represented by $C_{TE}(0)$ and $C_{TM}(0)$, and amplitudes at a position L are represented by $C_{TE}(L)$ and $C_{TM}(L)$, Equation (1) is used as the boundary conditions, and $C(L)=Ti \cdot C(0)$ (in which [·] indicates multiplication) is obtained by rearrangement, so that transfer matrix Ti is obtained for each unit section at each wavelength in a predetermined range.

[Equation 6]

$$\begin{bmatrix} C_{TE}(L) \\ C_{TM}(L) \end{bmatrix} = \begin{bmatrix} \dfrac{\gamma-\delta}{2\gamma}e^{-j\gamma L} + \dfrac{\gamma+\delta}{2\gamma}e^{+j\gamma L} & \dfrac{(\gamma-\delta)(\gamma+\delta)}{2\kappa(L)\gamma}(e^{-j\gamma L} - e^{+j\gamma L}) \\ \dfrac{\kappa(L)}{2\gamma}(e^{-j\gamma L} - e^{+j\gamma L}) & \dfrac{\gamma+\delta}{2\gamma}e^{-j\gamma L} + \dfrac{\gamma-\delta}{2\gamma}e^{+j\gamma L} \end{bmatrix} \begin{bmatrix} C_{TE}(0) \\ C_{TM}(0) \end{bmatrix} \quad (6)$$

Transfer matrix T of the entire mode conversion portion can be obtained when the transfer matrixes of the individual unit sections are connected to each other using the following Equation (7).

[Equation 7]

$$T = T_n \cdot T_{n-1} \cdot \ldots \cdot T_2 \cdot T_1 \quad (7)$$

When the $C_{TE}$ and $C_{TM}$ at the inlet and the outlet of the mode conversion portion are represented by $C_{TE}(\text{in})$, $C_{TM}(\text{in})$, $C_{TE}(\text{out})$, and $C_{TM}(\text{out})$, the following equation (8) holds.

[Equation 8]

$$\begin{bmatrix} C_{TE}(\text{out}) \\ C_{TM}(\text{out}) \end{bmatrix} = T \begin{bmatrix} C_{TE}(\text{in}) \\ C_{TM}(\text{in}) \end{bmatrix} \quad (8)$$

The conversion rate $\chi_{TM}$ Of the entire mode conversion portion obtained when only a TE mode light wave is incident is the value of $C_{TM}(\text{out})$ at which the $C_{TE}(\text{in})$ is 1 and the $C_{TM}(\text{in})$ is 0.

In addition, as the analysis from the beginning through the equation (8), the following are assumed.

(A) Coupling coefficient $\chi$ when the TE mode is converted to the TM mode at a certain wavelength and that when the TM mode is converted to the TE mode are equal to each other.

(B) $|N_{TM}-N_{TE}|$ in a calculated wavelength range is assumed to be equal to $\Delta n$ of the substrate material.

(C) Reflection caused by refractive index distribution in the guide is ignored.

(D) Impedance of an optical system is constant.

Based on the above assumptions (A) to (D), by the Equation (8), calculation was performed in a wavelength range of 1,300 to 1,800 nm using a birefringence of each material at a central wavelength of 1,550 nm, and the results are shown in Table 1.

TABLE 1

| Material | Birefringence | Bandwidth at a conversion rate of 90% or more (nm) | Bandwidth at a conversion rate of 95% or more (nm) |
|---|---|---|---|
| Commercial available LiNbO$_3$ | 0.073 | <1 | <1 |

TABLE 1-continued

| Material | Birefringence | Bandwidth at a conversion rate of 90% or more (nm) | Bandwidth at a conversion rate of 95% or more (nm) |
|---|---|---|---|
| Commercial available LiTaO$_3$ | 0.0038 | 4 | 4 |
| LiTaO$_3$ | 0.0006 | 31 | 22 |
| LiTaO$_3$ | 0.0005 | 37 | 26 |
| LiTaO$_3$ | 0.0004 | 46 | 33 |
| LiTaO$_3$ | 0.0003 | 61 | 44 |
| LiTaO$_3$ | 0.0001 | 185 | 125 |

Table 1 shows the bandwidths of a communication waveband at TE-TM mode conversion rates of 90% or more and 95% or more, which are obtained when commercially available LiNbO$_3$, commercially available LiTaO$_3$, and LiTaO$_3$ having a smaller birefringence than that of the commercially available LiTaO$_3$ are used as a waveguide material.

As shown in Table 1, it is understood that in order to obtain a TE-TM mode conversion of 90% or more in a bandwidth of 35 nm, the birefringence is about 0.0005 or less. In addition, as LiTaO$_3$ having a birefringence of about 0.0005 or less, for example, LiTaO$_3$ which satisfies no=2.1188 and ne=2.1189 may be mentioned. Furthermore, it is also understood that in order to obtain a TE-TM mode conversion of 95% or more in a bandwidth of 35 nm, the birefringence is about 0.0003 or less.

Figure 6:
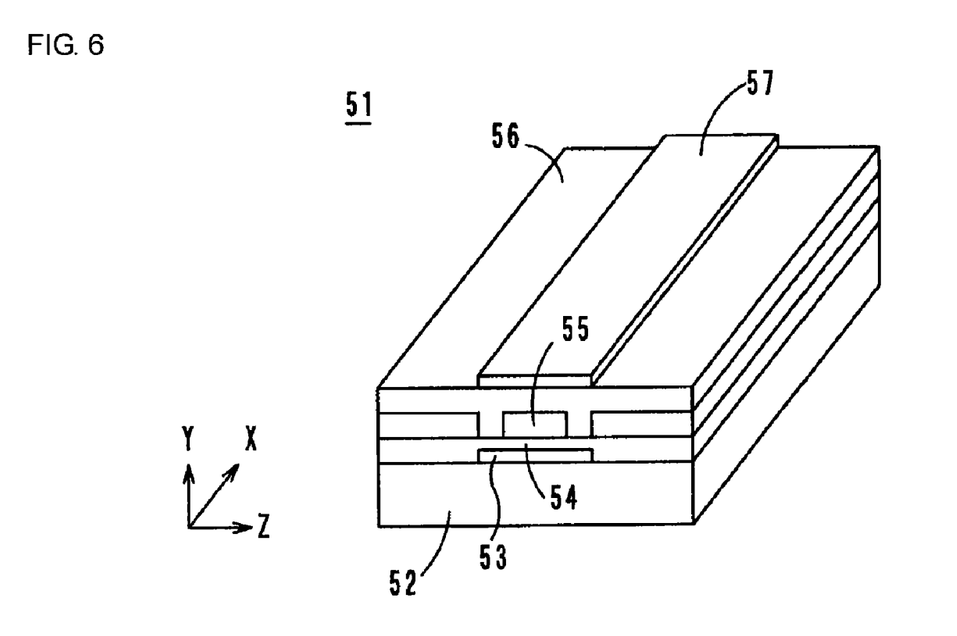
FIG. 6 is a perspective view showing the appearance of a TE-TM mode converter according to a modified example.

FIG. 6 is a perspective view showing the appearance of a TE-TM mode converter 51 of a modified example of the TE-TM mode converter 1 according to the above embodiment.

The TE-TM mode converter 51 has a substrate 52 composed of LiTaO$_3$ (lithium tantalate), a first electrode 53 composed of Al, a lower clad layer 54 composed of a UV adhesive, a waveguide 55 having a very small birefringence, an upper clad layer 56 composed of TiO$_2$, and a second electrode 57 composed of Al.

The substrate 52 is a substrate composed of LiTaO$_3$ having a molar fraction [Li]/([Li]+[Ta]) of 0.492, a birefringence of about 0.0004, and a thickness of 0.5 mm. This substrate 52 is a Y-cut crystal obtained by cutting approximately perpendicular to the Y axis.

The first electrode 53 is formed between the substrate 52 and the waveguide 55 so as to be approximately parallel thereto. The width of the first electrode 53 is 8 μm. The lower clad layer 54 is formed on the first electrode 53. The thickness of the lower clad layer 54 is 0.2 μm or more. The waveguide 55 is formed on the lower clad layer 54, and the lower clad layer 54 functions to adhere between the waveguide 55 and the first electrode 53.

The waveguide 55 functions to guide a light wave in a longitudinal direction thereof and is formed from LiTaO$_3$ having a molar fraction [Li]/([Li]+[Ta]) of 0.492 and a birefringence of about 0.0004 on the substrate 52 with the first electrode 53 and the lower clad layer 54 interposed therebetween so as to be approximately parallel to the first electrode 53. The thickness of the waveguide 55 is 4 μm which is equivalent to that of the waveguide 5 shown in FIG. 1, and the width of the waveguide 55 is 3.5 μm which is also equivalent to that of the waveguide 5 shown in FIG. 1.

The waveguide 55 is a Y-cut crystal obtained by cutting perpendicular to the Y axis, as the substrate 52. In addition, the birefringence of the substrate 52 and that of the waveguide 55 are preferably about 0.0005 or less and more preferably about 0.0003 or less.

The upper clad layer 56 is formed from a TiO$_2$ film so as to cover the top and the side surfaces of the waveguide 55. The second electrode 57 is formed from Al on the upper clad layer 56 so as to face the first electrode 53 with the waveguide 55 interposed therebetween and so as to be approximately parallel thereto. The width of the second electrode 57 is 8 μm.

In the TE-TM mode converter 51 shown in FIG. 6, since the distance between the first electrode 53 and the second electrode 57 can be decreased, the control voltage can be advantageously decreased as compared to that of the TE-TM mode converter 1 shown in FIG. 1. Hereinafter, the TE-TM mode converter 51 will be described in detail.

In a TE-TM mode converter using an electrooptic effect, by applying an electric field to a waveguide, a TE-mode light wave is coupled with a TM-mode light wave, and in addition, by using a grating, phase matching between the TE-mode light wave and the TE-mode light wave is performed. A cycle Λ of this grating is represented by the following equation (9) when the birefringence and the wavelength of a guided light wave are represented by Δn and λ, respectively.

[Equation 9]

$$\Lambda = \lambda/\Delta n \quad (9)$$

According to the Equation (9), when the birefringence Δn is extremely decreased, the grating cycle Λ can be extremely increased. Hence, in this embodiment, the waveguide 5 is formed from LiTaO$_3$ having a birefringence of about 0.0005 or less, which is significantly smaller than that of LiTaO$_3$ or LiNbO$_3$ having a birefringence of about 0.0038 and 0.073, respectively, those being generally commercially available. Accordingly, in the TE-TM mode converter 51 of this embodiment, the grating cycle Λ can be significantly increased, and even when the grating is not formed, the phase matching between the TE mode light wave and the TM mode light wave can be performed. In a TE-TM mode converter 100 having a grating as shown in FIG. 12, a Z-cut crystal must be used for the waveguide 102; however, in the TE-TM mode converter 51 shown in FIG. 6, a Y-cut crystal can be used for the waveguide 55. Accordingly, the first electrode 53 and the second electrode 57 can be provided on the top and the bottom of the waveguide 55. As a result, since the distance between the first electrode 53 and the second electrode 57 can be decreased, the TE-TM mode converter 51 can be driven even at a low voltage, and in addition, the size of the TE-TM mode converter 51 can be reduced.

For example, in the TE-TM mode converter 1 shown in FIG. 1, in order to uniformly apply an electric field to the waveguide 5 in the Y axis direction, the first electrode 3 and the second electrode 7 are disposed apart from each other at a distance of approximately 20 μm. Hence, in order to sufficiently drive this TE-TM mode converter 1, a high voltage of 10.0 V must be applied between the first electrode 3 and the second electrode 7, or by increasing the length of the TE-TM mode converter 1, the length of the first electrode 3 and that of the second electrode 7 must be sufficiently increased.

In contrast, in the TE-TM mode converter 51 of this embodiment, the distance between the first electrode 53 and the second electrode 57 is smaller than that of the TE-TM mode converter 1. Hence, compared to the TE-TM mode converter 1, the TE-TM mode converter 51 can be driven at a low voltage. In addition, even when the voltage is not decreased, the TE-TM mode converter 51 can be driven even when it has a smaller length. For example, in the TE-TM mode converter 51, when the electrodes have the same length as those of the TE-TM mode converter 1, a voltage of 4.0 V, which is smaller than that to be applied to the TE-TM mode converter 1, may only be applied between the first electrode 53 and the second electrode 57.

In addition, when the refractive index of the substrate 2 or 52 is smaller than that of the waveguide 5 or 55, respectively, the lower clad layer 4 or 54 may be omitted.

Next, a method for manufacturing the TE-TM mode converter 1 of this embodiment will be described with reference to the drawings. FIGS. 7 to 11 are perspective views of the appearance of the TE-TM mode converter 1 in process.

First, manufacturing of a wafer of $LiTaO_3$ having a birefringence of 0.0004 used as a material for the substrate 2 and the waveguide 5 will be described. In order to obtain a molar ratio of $Li_2CO_3$ to $Ta_2O_5$ of about 0.550 to 0.450, 661.8 g of $Li_2CO_3$ and 3,238.2 g of $Ta_2O_5$ were weighed and were then charged in a fluorinated resin-made pot, followed by stirring and mixing for one hour while moisture absorption was being carefully prevented. Subsequently, calcination was performed at 1,300° C. for 8 hours, so that an intended raw material solution was obtained.

While moisture absorption was being carefully prevented, the raw material solution was charged in a double structure crucible made of Ir and was then heated, and after the crucible was rotated alternately in a clockwise direction and an anticlockwise direction for one hour at 5 rpm to homogenize the solution, single crystalline $LiTaO_3$ was grown. As for the growth conditions, the crystal rotation rate and the pulling rate were set constant to 6 rpm and 1.0 mm/h, respectively, and the growth atmosphere was nitrogen containing 0.05% to 1% of oxygen. Since the above composition was not a congruent melting composition, the crystal growth was performed for about 10 percent by weight of the raw material solution at which the composition deviation has no influence.

As a result, a $LiTaO_3$ crystal was obtained which had a diameter of 60 mm, a length of 20 mm, and a composition having a molar fraction $[Li]/([Li]+[Ta])$ of 0.492. The single crystal thus obtained was sandwiched by Pt plates perpendicularly to the Z axis direction and was then placed in a resistance heating furnace. After the temperature was increased to 750° C. and was held for a sufficient time, while a direct current at a current density of 0.02 $mA/cm^2$ was allowed to flow using the Pt plates as electrodes, the temperature was slowly decreased to room temperature at a rate of 20° C./h.

A plate sample was formed by cutting from a plane perpendicular to the Y axis direction, and two primary surface of the sample were then processed by a mirror polishing treatment, so that a final sample having a thickness of 0.5 mm was obtained. When refractive index measurement was performed for the plate sample by a prism coupling method, at a measurement wavelength of 1,550 nm, the birefringence $\Delta n$ (=ne−no) was 0.0004. As $LiTaO_3$ having a birefringence of 0.0004, for example, $LiTaO_3$ which satisfies no=2.1189 and ne=2.1193 may be mentioned. As a result, a wafer of $LiTaO_3$ having a diameter of 50 mm and a birefringence of 0.0004 could be obtained.

In addition, it was verified by the inventor of the present invention that when the above method for manufacturing a wafer of $LiTaO_3$ is used, the birefringence with respect to a near-infrared ray of 1,000 nm or more, which is an optical communication band, can be controlled on the order of 0.00001.

Figure 7:
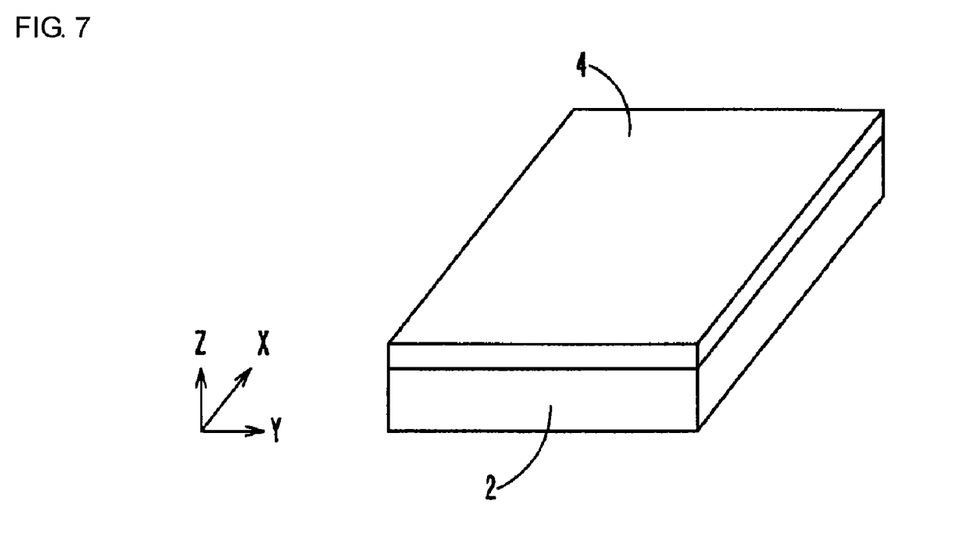
FIG. 7 is a perspective view showing the appearance of a TE-TM mode converter in process.

Next, in a clean room, as shown in FIG. 7, by using the wafer described above as the substrate 2, a UV adhesive was applied on the primary surface thereof by a spin coating method to form the lower clad layer 4.

Figure 8:
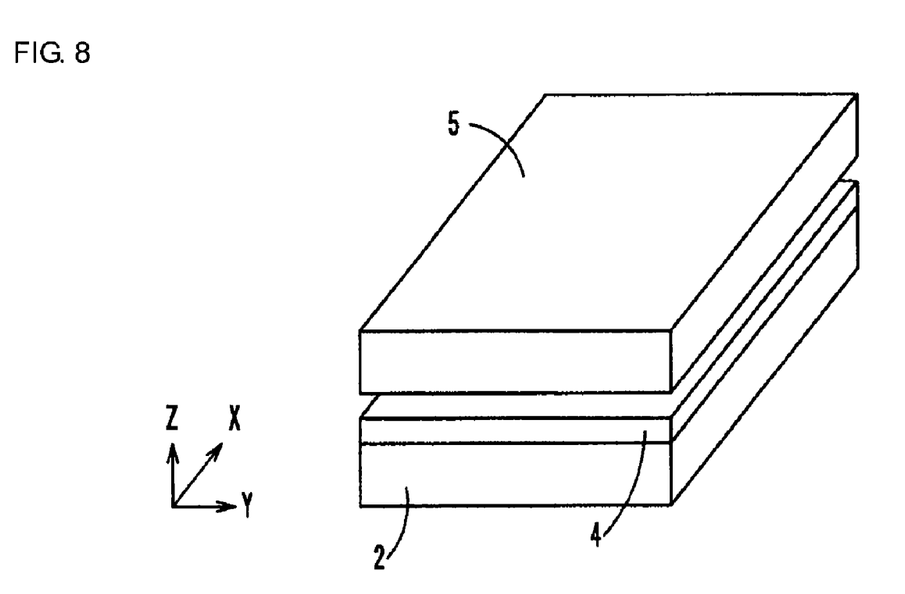
FIG. 8 is a perspective view showing the appearance of the TE-TM mode converter in process.

Subsequently, as shown in FIG. 8, a wafer of $LiTaO_3$ to be formed into the waveguide 5 was closely brought into contact with the top surface of the lower clad layer 4 and was irradiated by a xenon lamp while a pressure is being applied on the wafer. As a result, the lower clad layer 4 of the UV adhesive was cured, and the substrate 2 and the wafer of $LiTa_3$ to be formed into the waveguide 5 were adhered to each other.

Figure 9:
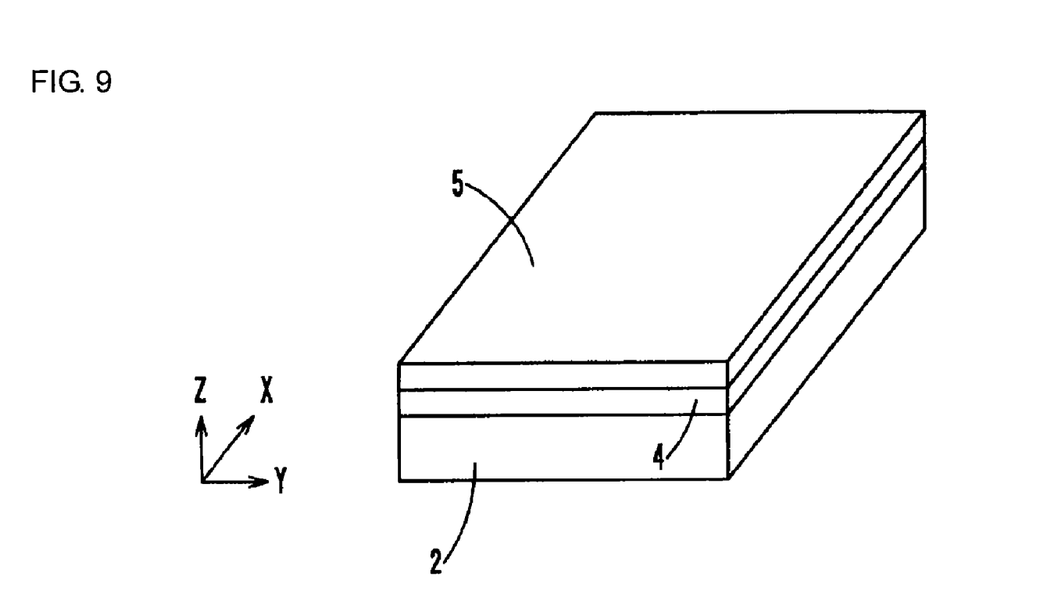
FIG. 9 is a perspective view showing the appearance of the TE-TM mode converter in process.

Next, the primary surface of the wafer to be formed into the waveguide 5 was processed by chemical mechanical polishing using colloidal silica, so that as shown in FIG. 9, the thickness of the wafer was decreased to 4 μm by polishing.

Figure 10:
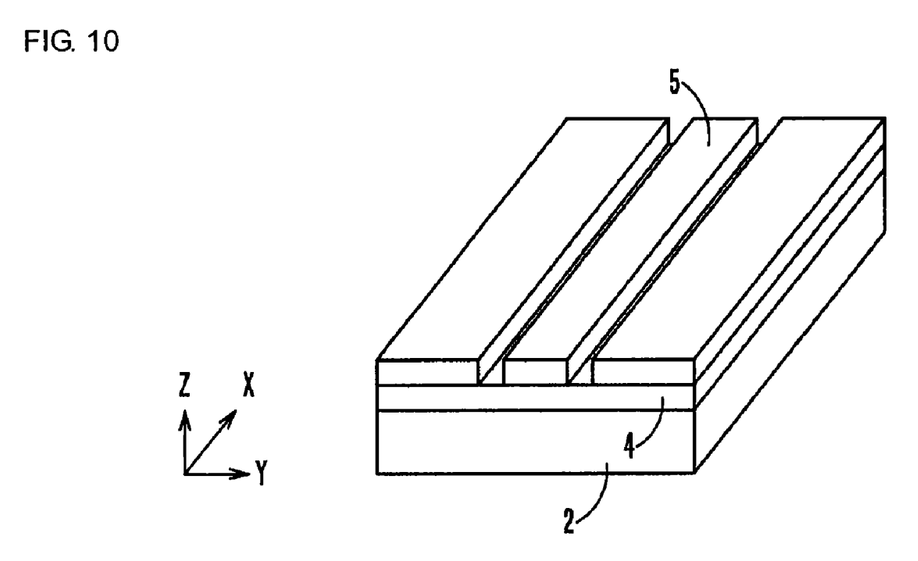
FIG. 10 is a perspective view showing the appearance of the TE-TM mode converter in process.

Subsequently, using a dicing saw, the wafer to be formed into the waveguide 5 and the lower clad layer 4 were partly milled away to form two grooves as shown in FIG. 10. As a result, the waveguide 5 was formed having a width of 3.5 μm.

Figure 11:
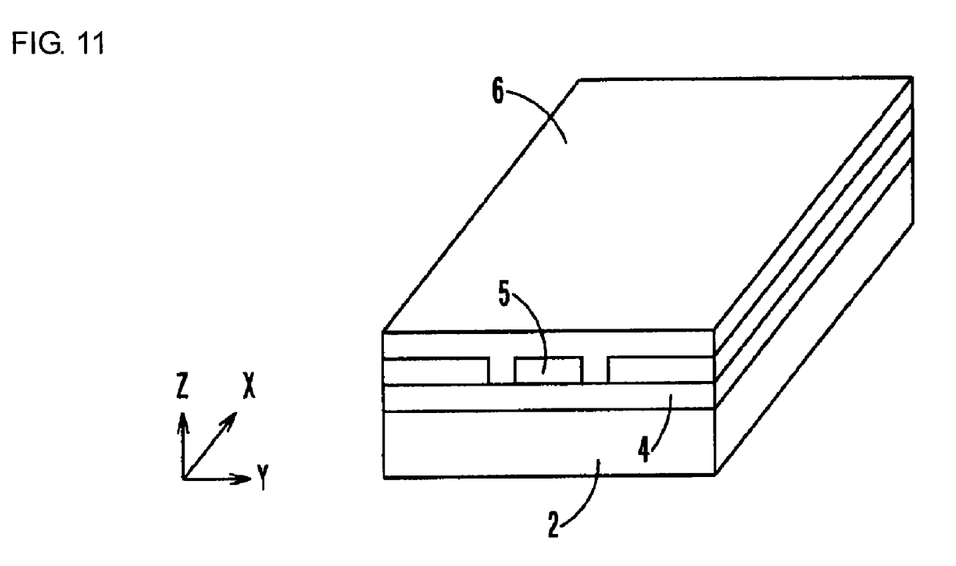
FIG. 11 is a perspective view showing the appearance of the TE-TM mode converter in process.

Next, as shown in FIG. 11, the upper clad layer 6 of $TiO_2$ having a thickness of 1 μm was formed on the waveguide 5. Finally, as shown in FIG. 1, the first electrode 3 and the second electrode 7 were formed from Al on the upper clad layer 6, so that the TE-TM mode converter 1 was completed.

In addition, hereinafter, manufacturing of a wafer of $LiTaO_3$ having a birefringence of 0.0001 used as a material for the substrate 2 and the waveguide 5 will also be described. In order to obtain a molar ratio of $Li_2CO_3$ to $Ta_2O_5$ of about 0.553 to 0.447, $Li_2CO_3$ and $Ta_2O_5$ were weighed and were then charged in a fluorinated resin-made pot, followed by stirring and mixing for one hour while moisture absorption was being carefully prevented. Subsequently, calcination was performed at 1,300° C. for 8 hours, so that an intended raw material solution was obtained.

While moisture absorption was being carefully prevented, the raw material solution was charged in a double structure crucible made of 1r and was then heated, and after the crucible was rotated alternately in a clockwise direction and an anticlockwise direction for one hour at 5 rpm to homogenize the solution, single crystalline $LiTaO_3$ was grown. As for the growth conditions, the crystal rotation rate and the pulling rate were set constant to 6 rpm and 1.0 mm/h, respectively, and the growth atmosphere was nitrogen containing 0.05% to 1% of oxygen. Since the above composition was not a congruent melting composition, the crystal growth was performed for 10 percent by weight of the raw material solution at which the composition deviation has no influence.

As a result, a $LiTaO_3$ crystal was obtained which had a diameter of 60 mm, a length of 20 mm, and a composition having a molar fraction $[Li]/([Li]+[Ta])$ of 0.495. The single crystal thus obtained was sandwiched by Pt plates perpendicularly to the Z axis direction and was then placed in a resistance heating furnace. After the temperature was increased to a 750° C. and was held for a sufficient time, while a direct current at a current density of 0.02 $mA/cm^2$ was allowed to flow using the Pt plates as electrodes, the temperature was slowly decreased to room temperature at a rate of 20° C./h.

A plate sample was formed by cutting from a plane perpendicular to the Y axis direction, and two primary surface of the sample were then processed by a mirror polishing treatment, so that a final sample having a thickness of 0.5 mm was obtained. When refractive index measurement was performed for the plate sample by a prism coupling method, at a measurement wavelength of 1,550 nm, the birefringence $\Delta n$ (=ne−no) was 0.0001. As $LiTaO_3$ having a birefringence of 0.0001, for example, $LiTaO_3$ which satisfies no=2.1188 and ne=2.1189 may be mentioned. As a result, a wafer of $LaTiO_3$ having a diameter of 50 mm and a birefringence of 0.0001 could be obtained.

In addition, the birefringence is approximately proportional to the composition ratio of a $LiTaO_3$ single crystal. Accordingly, when the molar ratio of $Li_2CO_3$ to $Ta_2O_5$ is controlled, the birefringence can be adjusted. In particular, when the composition ratio of Li to Ta is increased, the refractive index of a TM mode light wave can be decreased, and hence the birefringence can be decreased.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A TE-TM mode converter using an electrooptic effect, comprising:
    a substrate;
    a waveguide disposed on the substrate, the waveguide comprising lithium tantalate having a birefringence of 0.0005 or less, the waveguide guiding light waves in a direction perpendicular to a Z-axis of the lithium tantalate; and
    a voltage application unit that applies a control voltage to the waveguide in a direction perpendicular to a traveling direction of light and to the Z-axis of the lithium tantalate, the voltage application unit including a single first electrode and a single second electrode disposed so as to face each other with the waveguide interposed therebetween, and disposed in a direction substantially parallel to the traveling direction of the light.

2. The TE-TM mode converter according to claim 1, wherein the birefringence is 0.0003 or less.

3. The TE-TM mode converter according to claim 1, wherein the waveguide has a thickness and width that allows guiding of a single-mode light wave having a wavelength of about 1.55 µm.

4. The TE-TM mode converter according to claim 1, wherein the waveguide is a Z-cut crystal.

5. The TE-TM mode converter according to claim 1, wherein the waveguide is a Y-cut crystal.

6. The TE-TM mode converter according to claim 1, wherein the waveguide is surrounded by materials having a refractive index lower than a refractive index of the waveguide.

7. The TE-TM mode converter according to claim 1, further comprising:
    a first clad layer interposed between the substrate and the waveguide; and
    a second clad layer covering the waveguide.

8. The TE-TM mode converter according to claim 1, wherein the first electrode is disposed between the substrate and the waveguide, and the second electrode is disposed to face the first electrode with the waveguide interposed therebetween.

9. The TE-TM mode converter according to claim 1, wherein the substrate comprises lithium tantalite.

10. The TE-TM mode converter according to claim 1, wherein the substrate is a Z-cut crystal.

11. The TE-TM mode converter according to claim 1, wherein the substrate is a Y-cut crystal.

12. The TE-TM mode converter according to claim 1, wherein the waveguide consists essentially of the lithium tantalate having a birefringence of 0.0005 or less.

* * * * *